May 3, 1960 R. LESLEY 2,935,278
DUAL WHEEL LANDING GEAR ASSEMBLY
Filed Nov. 3, 1955 4 Sheets-Sheet 1

INVENTOR.
Ralph Lesley
BY
ATTORNEY.

INVENTOR.
Ralph Lesley

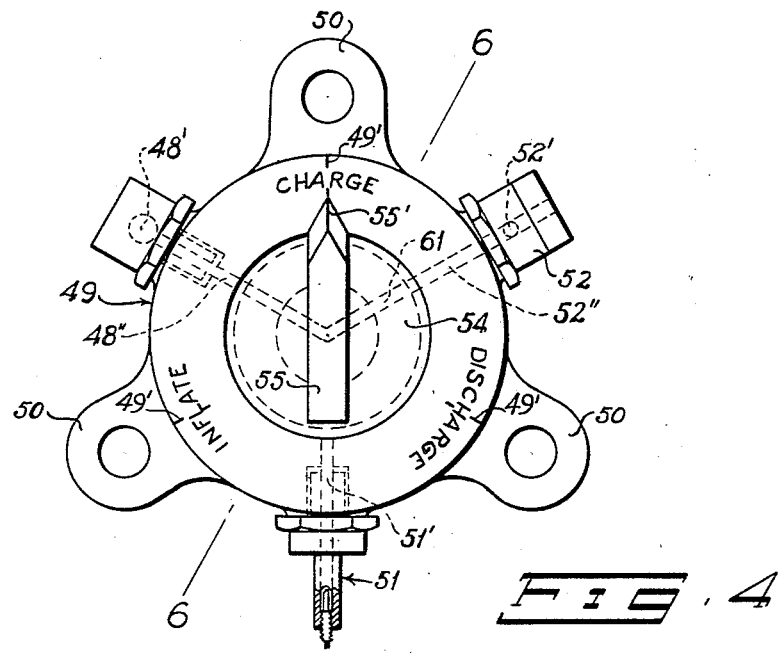
FIG. 4
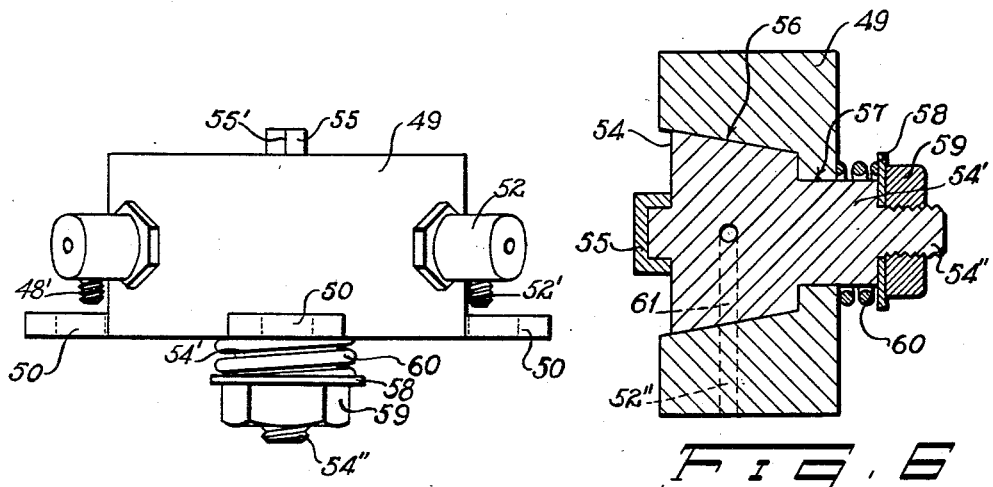
FIG. 5
FIG. 6

United States Patent Office 2,935,278
Patented May 3, 1960

---

2,935,278

DUAL WHEEL LANDING GEAR ASSEMBLY

Ralph Lesley, Massapequa, N.Y., assignor to Republic Aviation Corporation, Farmingdale, N.Y., a corporation of Delaware Application November 3, 1955, Serial No. 544,651

16 Claims. (Cl. 244—103)

This invention relates to landing gears for aircraft and more particularly to a dual wheel landing gear assembly having releasable means operable between the wheels of the assembly to connect them one to the other for unitary operation and including means operative upon the release of said connecting means to release and jettison one of the wheels.

Among its other objects, the present invention has in view a dual wheel landing gear assembly for equal distribution of the load of the aircraft on and over a relatively large area of ground or runway prior to take-off. At the same time the invention proposes means by which one of the wheels of the assembly may be released and jettisoned after take-off, i.e. when the aircraft becomes airborne. Thus the instant dual wheel assembly provides enlarged bearing and supporting surfaces for the aircraft during and prior to take-off and by providing means for the release and jettisoning of one of the wheels of the assembly requires only the storage space within the aircraft necessary for the housing of one wheel upon retraction of the landing gear after the aircraft is airborne. This saves both weight and space.

In addition, the instant invention contemplates use of air under pressure in the tire of the auxiliary or droppable wheel to eject said wheel from the dual assembly. Moreover, this ejection of the auxiliary wheel is substantially instantaneous upon its release from the main wheel and is so effected and controlled that the likelihood of it striking any portion of the aircraft is reduced, if not eliminated.

With the above and other objects in view, as will be apparent, this invention consists in the construction, combination and arrangement of parts all as hereinafter more fully described, claimed and illustrated in the accompanying drawings, wherein:

Fig. 4 is an enlarged elevation of the control by which air under pressure in the tire of the auxiliary wheel is directed to the ejection mechanism for the operation thereof and the means by which it is adjusted;

Fig. 5 is a plan view thereof; and

Fig. 6 is a transverse section taken along line 6—6 of Fig. 4.

Figure 1:
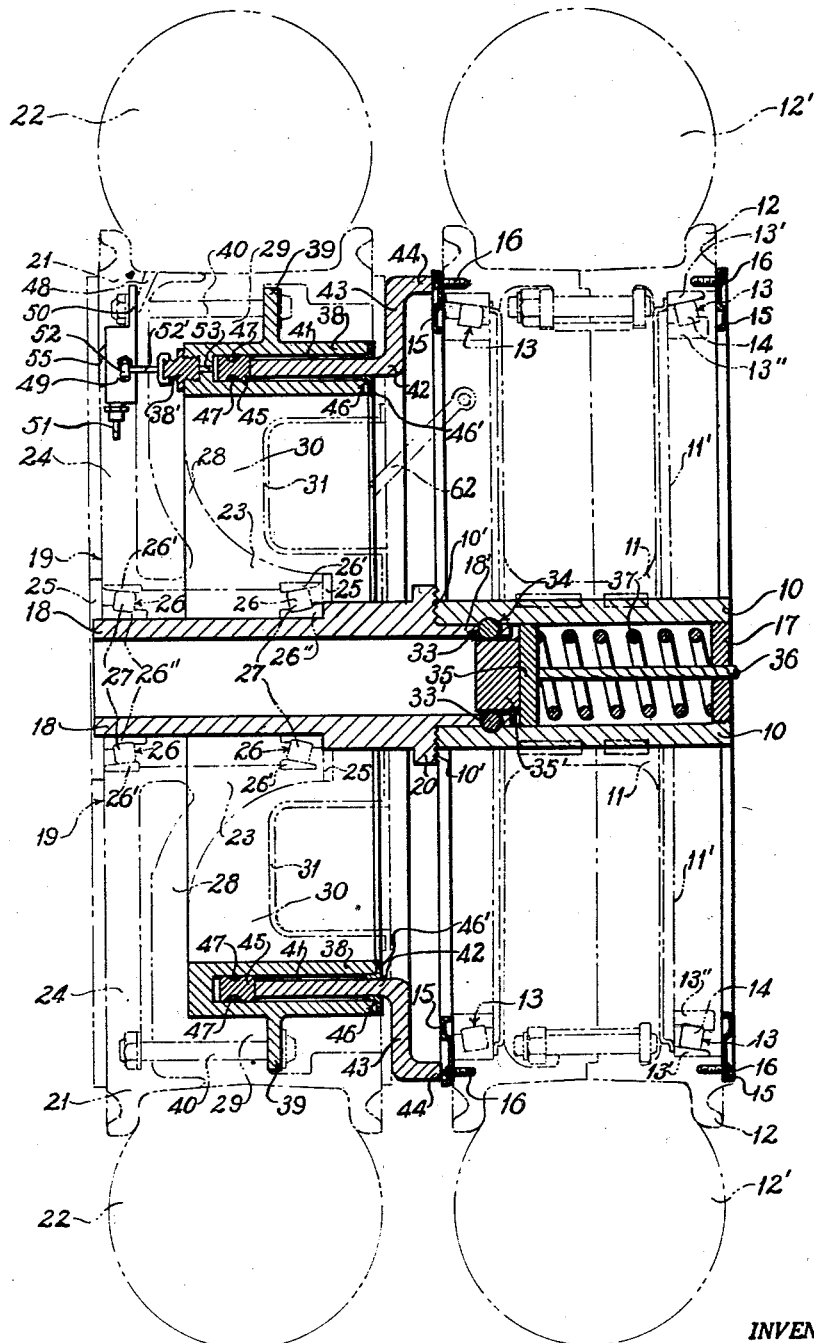
Fig. 1 is a section through a dual wheel landing gear assembly and illustrates the releasable connection between the wheels thereof and the means for the release and jettisoning of one of said wheels as proposed by the present invention, the auxiliary wheel being shown locked to the main wheel.

Multiple wheel landing gears have been heretofore employed on aircraft and particularly on the heavier type of aircraft such as bombers, cargo and transport airplanes, to the end that the gross weight of such aircraft will be distributed over a larger area or surface of the ground or runway. Thus, the ground, runway or other supporting surface is better able to withstand a greater load than it would if a single wheel were employed.

Such use of multiple wheel landing gears, however, adds weight to the aircraft and requires greater storage space within the aircraft when retracted than that necessary for a single wheel. This is particularly critical in high-speed aircraft where weight must be kept to the lowest possible minimum and space within the airplane is limited.

The present invention proposes a dual wheel landing gear assembly wherein one of the wheels is releasably mounted so that it will normally coact with the other wheel of the assembly to support the aircraft while on the ground prior to and during take-off, but when the aircraft becomes airborne, may be released and dropped prior to retraction of the landing gear, and remaining wheel into the aircraft. Usually the aircraft in take-off is considerably heavier than it is when it lands because its payload, i.e., cargo, bombs, missiles, fuel, etc. has been expended. Therefore, the single remaining wheel is adequate to support the aircraft during and after landing. For convenience, the wheel of the assembly that is jettisoned or dropped will be referred to herein as the "auxiliary wheel" while that which is permanently a part of the aircraft and remains after the auxiliary wheel is dropped, will be designated as the "main wheel."

The actual release or jettisoning of the auxiliary wheel after it has been disengaged from the main wheel is accomplished by the air under pressure within the tire of the auxiliary wheel. An internal compartment is provided in the auxiliary wheel for the accommodation of a parachute to the end that upon being dropped, the auxiliary wheel will descend gradually or float to the ground with little or no damage whereupon it may be recovered and used repeatedly.

Referring more particularly to the drawings, 10 designates an axle for the main or primary landing gear wheel. This axle is fixedly mounted to and carried at the outer end of a standard shock strut assembly (not shown) in the conventional manner. A hub 11 is keyed or otherwise secured in any suitable manner to the axle 10 to form, in effect, an integral part thereof. This hub 11 carries the spokes or wheel body 11' as an integral part thereof. A rim 12 adapted to receive and mount a conventional tire 12' is attached to the periphery of the wheel body 11' for rotation on and relative to said body or spokes 11'.

Interposed between the face of the rim 12 and the periphery of the spokes 11' are anti-friction means 13. Each anti-friction means 13 consists of an outer race 13' secured to the rim 12 and an inner race 13" similarly secured to the periphery of the body 11'. A plurality of rollers or balls 14 operates between the races 13' and 13" to thereby facilitate the rotation of the rim 12 on and with respect to the spokes or body 11'.

An annular cover plate 15 is secured to the opposed edges of the rim 12 by a plurality of screws or similar fastening means 16. The width of each of these cover plates 15 is such that it overlaps the junction between the periphery of the spokes or body 11' and the rim 12 to prevent dust, dirt and the like from entering and accumulating in the anti-friction devices 13. One of these plates 15 also serves as an abutment for the mechanism by which the auxiliary wheel is removed from the assembly as will be described.

The axle 10 is a hollow cylinder or tube and is closed at one end by a wall which may consist of a plug or disc 17 threaded into the end of the axle. The opposite or open end of the axle 10 is adapted to telescopically receive an end extension 18' of a hollow, substantially cylindrical axle 18 of an auxiliary wheel 19, the outside diameter of this extension 18' being substantially equal to the inside diameter of the axle 10.

An integral collar or lateral flange 20 is provided on the axle 18 adjacent the extension 18' thereof to limit the telescoping of said extension in the axle 10 by contacting the end of the latter. Serrations 10' are formed on the abutting end of the axle 10 and face of the collar 20 whereby the axles 10 and 18 are locked against relative rotation when the extension 18' of the axle 18 is fully telescoped within the axle 10. If required or desired, longitudinal splines may be employed between the telescoped extension 18' of the axle 18 and axle 10 in lieu of the serrations 10' to lock the axles against relative rotation at all times while the axles 10 and 18 are telescoped.

The auxiliary wheel 19 is rotatably mounted on its axle 18, anti-friction devices 26 being interposed between the hub 23 of the wheel 19 and axle 18. More specifically, the auxiliary wheel 19 consists of an outer annular rim 21 to engage and retain an inflatable tire 22 and a hub 23 adapted to be mounted for rotation on the axle 18. A plurality of spokes 24 integrally connects the rim 21 to the hub 23. The length of the spokes 24 is such that the rim 21 of the auxiliary wheel 19 is disposed in the plane of the rim 12 of the main wheel to the end that the tires 12' and 22 both equally support the airplane.

The hub 23 is substantially coextensive with the axle 18 and is secured against longitudinal displacement relative to the axle by a conventional lock ring 25 interposed between the axle and hub at either end of the hub.

One set of races 26' of the anti-friction device 26 is immovably secured to the hub 23, while a complemental set of races 26" is similarly secured to the axle 18 and the rollers or balls 27 operate between these. The lock rings 25 are wide enough to overlie and cover the adjacent edges of the hub 23 and axle 18 and exclude dust, dirt, etc. from the anti-friction device 26.

For structural purposes and to augment the spokes 24 in supporting the rim 21, webs 28 are formed between the hub 23 and the rim 21. These webs 28 project laterally from the hub 23 adjacent the inner end thereof and are arcuately shaped in section to extend from the hub 23 in the direction of the spokes 24 to a point just short of the plane of spokes 24. From this point the webs 28 extend in a plane parallel to that of the spokes 24 and terminate in a lateral annular boss 29. The boss 29 thus formed is substantially parallel to axle 18 and medially of its width is connected to the rim 21.

From the foregoing it is apparent that the auxiliary wheel 19 is of a relatively light construction with no substantial reduction in strength and rigidity. At the same time, its design is such that an annular recess or compartment 30 is established in the inner side thereof for the reception and accommodation of an annular container or cannister 31. This cannister 31 may be bolted or otherwise fixedly secured to the axle 18 or wheel 19 in any suitable manner and is adapted to receive and house a parachute (not shown) as well as additional mechanisms to be described.

In order that the auxiliary wheel 19 may be secured to, so as to be carried by, the main wheel and more particularly the axle 10, a releasable lock mechanism is provided. This lock comprises one or more apertures 33 which pierce the wall of the axle 18 adjacent the end 18' thereof. The wall of each of the apertures 33 is concave whereby the diameter of each aperture is smaller at its outer ends than in the center thereof. This is effected, for example, by drilling or otherwise forming each aperture 33 in a frusto-conical shape and then crimping the edge of the aperture defining the larger diameter to reduce the size of said diameter to substantially equal that of the smaller diameter, thereby creating a cage in each aperture whereby a ball 33' may be retained therein. The ball 33' has a diameter slightly larger than the smallest diameter of the aperture 33 and when received in an aperture 33, a portion of the ball projects beyond one face or the other of the axle 18. Moreover, the diameter of each ball 33' is approximately one and one-half times the thickness of the wall of the axle 18 and the smallest diameter of the aperture 33 is such that the ball 33' lies approximately in one face of the wall of the axle 18 when the ball is projected as far as possible beyond the opposed face of the wall.

Mounted within the hollow axle 10 of the main wheel is a plunger 35. This plunger 35 has an outer diameter substantially equal to the internal diameter of the axle 10 and is shouldered on the end thereof away from the wall 17 to create an integral extension 35' having a diameter smaller than that of the plunger. The plunger 35 is adapted for sliding movement within the axle 10, a rod or cable 36 being threaded or similarly connected to the plunger 35. This rod or cable 36 passes through an aperture centrally located in the end wall 17 and is attached to the end of the plunger. The wall 17 thus serves to limit the movement of the plunger 35 in one direction. Any suitable linkage or control system may be employed between the rod or cable 36 and a control point for the operation of the plunger.

A compression spring 37 is disposed within the axle 10 around the rod or cable 36 with its opposed ends operative against the inner face of the wall 17 and the adjoining face of the plunger 35 to constantly urge said plunger away from said wall 17. Thus, when the axle 18 is fully inserted in the end of the axle 10 and the spring 37 urges the plunger 35 toward the end of the axle 18 within the axle 10, the balls 33' are forced outwardly of their apertures 33 by the plunger extension 35'.

Figure 2:
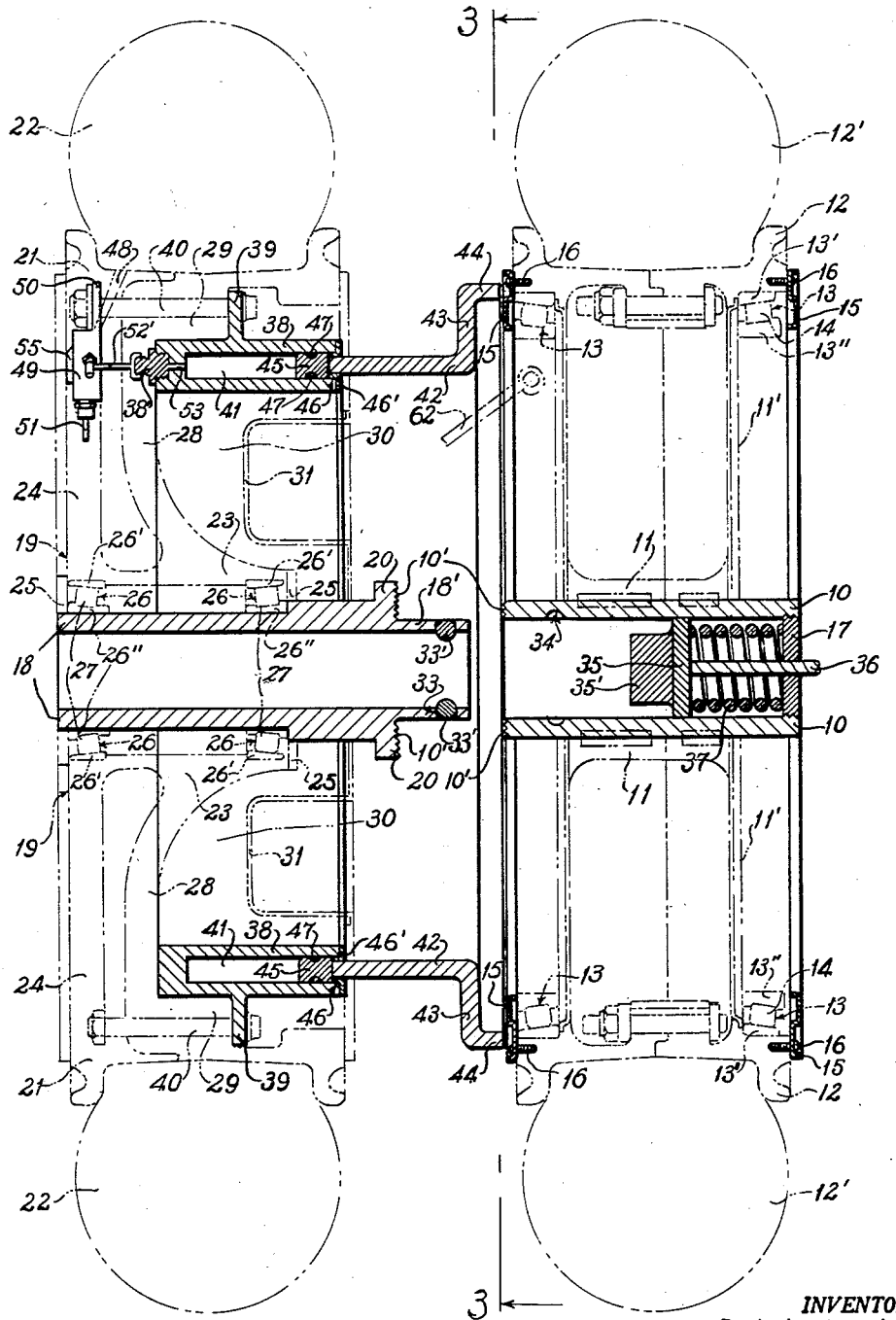
Fig. 2 is a view similar to Fig. 1 and shows the unlocked or released position of the auxiliary wheel and the operation of the jettisoning means.

In order that the balls 33' may serve to lock the axle 18 to the axle 10 when telescoped therein, a series of complementary recesses 34, each conforming in size and shape to the projected portion of a ball 33', is provided in the inner surface of the axle 10, into each of which one of the balls 33' is projected by the plunger extension 35'. Therefore, when the axles 10 and 18 are joined or telescoped one within the other, the extension 35' is projected into the end of the axle 18 by the spring 37 and the balls 33' are simultaneously forced thereby into their respective recesses 34. This operation serves to lock the axles one to the other whereby the axle 18 becomes coextensive with the axle 10 and is releasably fixed in this position. Prior to the locking engagement of the axles 10 and 18 as aforesaid, and for the release of such locking engagement, the spring 37 is compressed and held compressed by the rod or cable 36 (as shown in Fig. 2). To lock the axles 10 and 18 together (as shown in Fig. 1), the holding tension on the rod or cable 36 is relaxed to allow the spring 37 to expand, moving the plunger 35 toward the end of the axle 18 and projecting the plunger extension 35' into the open end of this axle where it projects the balls 33' outwardly into the recesses 34 of the axle 10. The location of the recesses 34 in the axle 10 is such that when the balls 33' are received therein, the end of the axle 10 abuts the face of the collar or flange 20 on the axle 18.

In order to effect the ejection or separation of the auxiliary wheel 19 from the main wheel upon the release of the ball lock mechanism by retracting the plunger 35 and its extension 35' by means of the rod or cable 36, power ejection means is provided. More particularly, this power ejection means consists of a hollow annular cylinder 38 disposed and contained within the compartment 30. Medially of its circumferential outer face, the cylinder 38 is provided with a plurality of lateral ears 39 adapted to overlie a face of the boss 29 to which they are secured by bolts or other fastening means 40 thereby rigidly and fixedly mounting the annular cylinder 38 within the compartment 30 of wheel 19 so that its open end faces the main wheel of the assembly. When so secured to the auxiliary wheel 19, the cylinder 38 is concentrically disposed about the axle 18 with its closed end in substantial abutment with the webs 28, and its outer peripheral surface resting on the boss 29. The open end of the annular cylinder 38 then terminates in the plane of the edge of the rim 21 facing the main wheel. This cylinder 38 is formed with and defines a passage 41 which is also concentric to the axle 18.

An annular ring or piston 42 is disposed for reciprocation within the passage 41 of the annular cylinder 38. At its outer end the annular ring or piston 42 is off-set outwardly to create a radial extension 43 which terminates in a lateral flange 44 projecting in the direction of the main wheel and parallel or concentric to the axle 18. The length of the radial extension 43 is such that the lip 44 is disposed in alignment and for abutment with the cover plate 15 on the main wheel.

Figure 3:
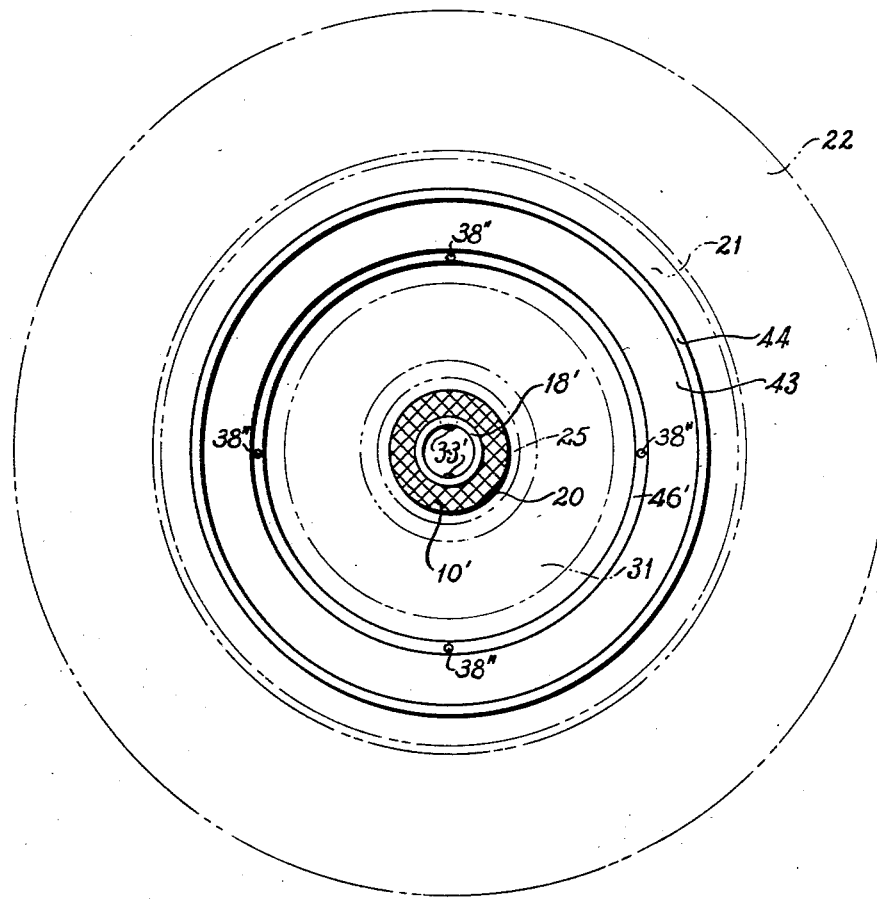
Fig. 3 is a view taken along line 3—3 of Fig. 2.

The thickness of the annular piston 42 is somewhat less than the internal width of the passage 41 of the annular cylinder 38. At its inner end, the piston 41 terminates in an enlarged head 45 having a thickness substantially equal to that of the passage 41 of the cylinder 38. The outer end of the annular cylinder 38 is provided with a pair of annular rings 46'. Each of these rings 46' is right-angular in section with one of its arms projecting into the outer extremity of the passage 41 of the cylinder 38 between the piston 42 and a wall of the cylinder and its other arm resting flush against the outer edge of that wall of the cylinder where it is secured in place by screws or similar fastening means 38'' (Fig. 3). In combination, these rings 46' form a bushing 46 in the open end of the annular cylinder 38 through which the piston 42 may reciprocate. This bushing 46 serves the double purpose of supporting and guiding the annular piston 42 whereby said piston is concentrically disposed within the passage 41 of the annular cylinder 38 and at the same time it acts as a stop to limit the outward movement of the piston 42 with respect to the cylinder when the head 45 abuts the inner end of such bushing. The overall length of the annular piston 42 including the lip 44 and the piston head 45 at the opposite ends thereof is such that when the piston 42 is fully telescoped within the passage 41, the lip 44 will abut the cover plate 15 of the main wheel upon the association of both main and auxiliary wheels in the dual wheel assembly (Fig. 1).

The head 45 is rectangular in cross-section and constitutes a complete circle thereby conforming in general contour to the annular cylinder 38 and piston 42. Hence it has two opposed faces (Figs. 1 and 2) and each of these faces is provided with a continuous groove, in which is mounted a standard O-ring seal 47. These O-rings 47, seated in opposite faces of the head 45, act as seals between such head and the inner surfaces of the cylinder 38 to prevent leakage around the head 45.

The inflatable tire 22 carried by the auxiliary wheel 19 is provided with a conventional valve-stem 48 which projects therefrom and passes through an aperture in the rim 21 in the usual manner. A valve casing 49 is threadably mounted in the valve-stem 48 of the tire 22 by means of and through a nipple fitting 48' (Fig. 4) which extends laterally from the valve. One or more ears 50 are provided on the valve casing 49 by which it is connected by one or more of the bolts 40 to the wheel 19 so that the casing 49 is fixedly carried on the outer side of said wheel or on the side thereof opposed to the piston 42 and its extension 43 and lip 44.

The valve casing 49 is further provided with an extension 51 in which a conventional Schrader valve is situated and permits air under pressure to pass to the tire 22 while preventing leakage of air therefrom. Also projecting from the valve casing 49 is a fitting 52 which includes an angularly disposed nipple 52' pointing in the direction of the auxiliary wheel 19 through which it passes to be threadably or otherwise secured to a union 38' mounted in and projecting from the closed end of the annular cylinder 38. This union 38' is in open communication with one end of a duct 53 in the closed end of the annular cylinder 38. At its other end the duct 53 opens into the passage 41 of the cylinder 38. Hence, communication is established between the fitting 52 and the passage 41 of the cylinder 38.

A rotary valve 54 is concentrically mounted in a seat 56 within the valve casing 49 and has a handle 55 attached to its outer end for the adjustment thereof relative to said seat.

To secure the valve 54 in the valve casing 49, the base or inner side of the casing 49 is pierced by an opening 57 concentric to the inner end of the seat 56. The valve 54 conforms in shape and size to the seat 56 and has a shank or stem 54' projecting therefrom to pass through the opening 57. This shank or stem 54' terminates in a reduced threaded end 54'' disposed outwardly of the inner side of the casing 49 on which is placed a washer 58 and nut 59, the washer normally resting on the shoulder between the stem 54' and the reduced end 54'' thereof. A coil spring 60 is disposed on the shank 54' between the washer 58 and the adjacent face of the valve casing 49 and operates on the valve 54 through the stem 54' to draw and hold the valve 54 in flush engagement with the seat 56 without interference with its rotary adjustment or regulation with respect to said seat.

As illustrated in Fig. 4, the valve casing 49 is provided with a port 48'' communicating with the fitting 48' at one of its ends and with the valve seat 56 at its other end; a similar port 51' is provided in the casing 49 between the valved extension 51 and the seat 56; and a third port 52'' is provided in the valve casing 49 connecting the fitting 52 with the valve seat 56. These ports 48'', 51' and 52'' are situated substantially equidistant around the casing 49 and are to be closed, opened or interconnected by the valve 54 for the purposes and in the manner to be described.

The control valve 54 is pierced internally by a transverse passage 61. Upon the rotation of the valve 54 in one direction, this passage 61 is moved to interconnect the port 51' and consequently the valved extension 51 with the port 48'' of fitting 48' communicating with the stem 48 leading into the tire 22. When the valve 54 is thus positioned, air delivered from an outside source to the valve extension 51 is conducted by the passage 61 of the valve to the port 48'' and thence through the fitting 48' and valve stem 48 to the tire for the inflation thereof. At the same time, the valve 54 closes the port 52''. When the control valve 54 is rotated in the reverse direction, its passage 61 is moved to interconnect the port 51' of the valved extension 51 with the port 52'' of the fitting 52 leading to the passage 41 of the annular cylinder 38. In this position of the valve 54 the port 48'' is closed and any air under pressure within the cylinder 38 may be bled from the cylinder through the port 52'', passage 61 and port 51' to the atmosphere provided the Schrader valve is opened in the conventional manner.

If the valve 54 is rotated to a position midway between the extreme positions just described, its passage 61 will connect the port 52'' of the fitting 52 with the port 48'' of fitting 48' and the stem 48 of the tire 22 and the port 51' is closed, all as shown in Fig. 4, whereby communication is established between the tire 22 and the passage 41 of the cylinder 38. In this position of the valve 54 air under pressure from the tire 22 of the auxiliary wheel 19 is admitted into the annular cylinder 38, thus charging the cylinder with air between the head 45 and the nipple 52' communicating with the duct 53 in the base of the cylinder. Hence, when the piston 42 is free to move outwardly of the cylinder 38, i.e. when the lock between the axles 10 and 18 is released, the air from the tire 22 operates against the head 45 to apply pressure whereby the lip 44 of the piston 42 is forced against the cover plate 15 of the main wheel. This action causes the auxiliary wheel 19 to move away from the main wheel and results in a complete separation of the axles 10 and 18, thereby freeing the wheel 19 and permitting it to jettison or drop.

Each position of the valve 54 is indicated by appropriate designations 49' on the outer face of the valve casing 49 which severally coact with a pointer 55' carried by the handle 55 of said valve. By adjusting the valve 54 through the handle 55 while the airplane is on the ground, it may be positioned to "discharge" air from the cylinder 38, then to "inflate" the tire 22 of the auxiliary wheel 19 and finally to "charge" cylinder 38 with air from the tire 22.

After the tire 22 is inflated with air under pressure as aforesaid and the control valve 54 is allowed to remain in the position where it connects the stem 48 of the tire 22 with the extension 51, i.e. with the pointer 55' of the handle 55 at "inflate" on the casing 49, the auxiliary wheel 19 may then be connected to the main wheel upon the insertion of the end 18' of the axle 18 into axle 10 of the main wheel and locked in that position by the balls 33' when the tension on the rod or cable 36 is released. The handle 55 may then be rotated to place the pointer 55' on "charge" on the casing 49 whereupon the tire stem 48 is interconnected with the passage 41 of the cylinder 38 permitting air under pressure from the tire 22 to enter such passage 41 and impact on the head 45 of the piston 42. When this occurs the annular piston 42 is forced outwardly of the passage 41 of the annular cylinder 38 in the direction of the main wheel but it is arrested or restrained from full movement by contact of its lip 44 against the cover plate 15 of the main wheel, the locking connection between the axles 10 and 18 at the same time preventing separation of the wheels by this pressure or impact.

After the airplane takes off and is airborne, the cable or rod 36 is pulled against the action of the spring 37 thereby permitting the balls 33' to move out of locking engagement in their respective recesses 34 in the axle 10. Upon this disconnection of the axles 10 and 18 and the resulting release of the auxiliary wheel 19, the air under pressure from the tire 22 operates against the head 45 of the piston 42 causing the full projection of the annular piston 42 outwardly of the cylinder 38 and of the auxiliary wheel 19. The force thus applied and exerted on and against the main wheel by the piston 42 through its lip or flange 44 causes the auxiliary wheel 19 to separate from the main wheel and drop or be jettisoned. Thereafter only the main wheel remains on the airplane to be retracted in the conventional manner into the aircraft for storage during flight.

The actuation of the rod or cable 36 may be accomplished through any mechanism which per se forms no part of the present invention. For example, such a mechanism might be operative automatically in response to the removal of the weight or load of the airplane from the landing gear assembly. In any event, tension is placed on the rod or cable 36 to retract the plunger 35 against the action of the spring 37 to allow the disengagement of the axles 10 and 18 and this tension is relieved or relaxed to permit the axles to be locked together in coextensive alignment.

Additionally, the invention contemplates a rip tape 62 (Figs. 1 and 2) of predetermined length fixedly secured at one end to the main wheel or to any part of the landing gear structure that remains with the airplane. At its other end this tape 62 is connected to the parachute housed within the canister 31 which in turn is secured to the axle 18 and housed within the annular compartment 30 in the auxiliary wheel 19. Thus, upon the separation and ejection of the auxiliary wheel 19 from the main wheel, the tape 62 will become taut and thereby withdraw the parachute from the canister 31. The tape 62 ultimately breaks or snaps to allow the auxiliary wheel 19 to descend or float independently to the ground.

The auxiliary wheel 19 may be recovered after having been thus dropped or jettisoned and the handle 55 of valve 54 is turned to the "discharge" position. The air under pressure in the passage 41 of the cylinder 38 may then be bled or exhausted through the extension 51 and the entire procedure repeated whereby auxiliary wheel 19 is operatively installed on another airplane. In this way the auxiliary wheel 19 may be employed repeatedly.

What is claimed is:

1. The combination with a dual wheel landing gear assembly comprising a main wheel and an auxiliary wheel each having an axle about which it independently rotates and a pneumatic tire, of means carried by one axle for engaging the other axle to align them whereby said axles form continuations one of the other, a lock cooperating with said means for securing the axles against relative displacement, a lock control to normally maintain said lock in its operative position and adjustable to release said lock, a piston carried by the auxiliary wheel for operation against the main wheel and conduit means connecting the interior of the tire of the auxiliary wheel with one side of said piston whereby the air under pressure therein operates against said piston at all times and projects it outwardly of the auxiliary wheel after the release of said lock.

2. A dual wheel landing gear assembly comprising a pair of wheels each having a hollow axle, said wheels being disposed side by side with their axles partly telescoped and in coextensive alignment, an annular cylinder carried by one of said wheels and disposed adjacent the other of said wheels, an annular piston mounted in said cylinder and extending outwardly thereof to abut said other wheel, a source of fluid under pressure connected to said annular cylinder and operative against said piston to force it outwardly of the cylinder to cause the separation of said axles, a lock securing the telescoped portions of said axles against relative movement and the action of said piston, and control means to release said lock and thereby permit the projection of said piston outwardly of the cylinder by the fluid pressure.

3. A dual wheel landing gear assembly comprising a main wheel and an auxiliary wheel, each of said wheels having a hollow axle and the axles of both wheels being normally aligned one with the other to operate in unison in supporting the weight of an airplane and one axle being partly telescoped with the other, an inflated tire on each of said wheels, a lock operative between the telescoped portion of said axles to maintain them in their normally aligned positions and against separation, an annular cylinder mounted on the auxiliary wheel and opening toward the main wheel, an annular piston mounted in said cylinder and abutting the main wheel, a conduit operable between the interior of the tire of the auxiliary wheel and said annular cylinder whereby air under pressure from said tire always operates against said piston and maintains its abutment with the main wheel, and a release for said lock whereby said piston is freed to separate said axles and remove the auxiliary wheel from the assembly by the action of said piston against the main wheel under pressure of air from said tire.

4. In an aircraft a dual wheel landing gear assembly comprising a pair of axles, the end portions of said axles being aligned and adapted to telescope one within the other, a rotatable wheel including an inflated tire mounted on each of said axles, pneumatic power means carried by one of said wheels, means to operate said power means by air pressure from the tire of the wheel carrying it to abut the power means against the other of said wheels whereby the wheels may be separated and one thereof removed from the assembly, a lock normally interposed between and engaging the telescoped axles to oppose and counteract the operation of said power means, and a release for said lock to permit the operation of said power means as aforesaid.

5. In an airplane a dual wheel landing gear assembly comprising a pair of axles one partially telescoped within the other, a rotatable wheel including an inflatable tire mounted on each of said axles, said wheels being parallelly disposed one to the other, a pneumatic power unit carried by one of said wheels and disposed adjacent the other of said wheels, conduit means interposed between said power unit and one of said tires, said means including an adjustable valve to establish communication therebetween whereby air under pressure from said tire charges said power means for the extension thereof to thereby separate the axles and remove one of said wheels from the assembly, a positive lock to secure the axles one to the other to oppose and suppress the operation of the power means, and a release for said lock operative to permit the power means to function after the valve has been adjusted as aforesaid.

6. In an aircraft a dual wheel landing gear assembly comprising a main wheel and an auxiliary wheel, each of said wheels including an axle and a pneumatic tire and the wheels being disposed side by side with their axles aligned and engaged one with the other, a pneumatic power unit carried by the auxiliary wheel and projecting therefrom in abutment with the main wheel, an air line communicating at one end with the pneumatic power unit and with the tire of the auxiliary wheel at its other end, a valve in said line to control the air flow therethrough whereby the power unit is normally operatively connected to and charged with air from the tire of the auxiliary wheel, a releasable lock fixedly connecting said axles one to the other to secure them in their aligned positions and normally opposing and suppressing the operation of the power unit, and means for releasing said lock thereby freeing the power unit for operation to thereby cause the separation of said axles and remove the auxiliary wheel from the assembly.

7. In an aircraft a dual wheel landing gear assembly comprisng a main wheel and an auxiliary wheel, each of said wheels including an axle and a pneumatic tire, said wheels being disposed side by side with their axles aligned one with the other, a stem projecting from the tire of the auxiliary wheel for the inflation thereof with air under pressure, a pneumatic power unit consisting of a cylinder and a piston carried by said auxiliary wheel with its piston in abutting contact with the main wheel, a valve casing carried by the auxiliary wheel, a connection between the stem of the tire of the auxiliary wheel and said casing, an inlet also connected with said valve casing whereby air under pressure may be delivered to said casing, a delivery connection between said valve casing and the cylinder of the power unit communicating with said cylinder back of the piston thereof, a valve mounted in said casing and adjustable to one position where it connects the inlet with the stem of the tire of the auxiliary wheel for the inflation thereof and to a second position where it connects the stem of the tire of the auxiliary wheel with the cylinder of said power unit to charge it with air under pressure and simultaneously closes said inlet, a lock to secure said axles one to the other, and release means coacting with said lock to disconnect and separate said axles and remove the auxiliary wheel from the assembly when the valve is adjusted to charge the cylinder of the power unit with air from the tire of the auxiliary wheel as aforesaid.

8. A dual wheel landing gear for airplanes comprising a main wheel and an auxiliary wheel, the auxiliary wheel including an inflated pneumatic tire, a pneumatic power unit carried by the auxiliary wheel consisting of a concentric annular cylinder and an annular piston reciprocable therein, said piston projecting toward and in abutment with the main wheel, a conduit connecting the cylinder of the power unit with the tire of the auxiliary wheel whereby said cylinder constantly receives and traps air under pressure from said tire to urge the piston against the main wheel, a lock interposed between said wheels to normally prevent the operation of said piston, and a pilot-operated control indirect engagement with said lock operative to release it and thereby free the piston for projection outwardly of the cylinder of the power unit by air from the tire of the auxiliary wheel to separate said wheels and remove the auxiliary wheel from the assembly.

9. In an aircraft the combination with a landing gear wheel, of an auxiliary wheel in removable engagement with said landing gear wheel at one side thereof, said auxiliary wheel having a pneumatic tire and an annular recess in one of its sides opening toward the landing gear wheel, said tire including a stem adapted to admit or discharge air under pressure, a concentric annular cylinder disposed within said recess, an annular piston mounted for reciprocation in said cylinder and projecting from the recessed side of the auxiliary wheel for abutment against the landing gear wheel, an air line connecting the end of the cylinder aft of said piston to the stem of the tire whereby air from the tire urges said piston outwardly of the cylinder in the direction of the landing gear wheel, a valve disposed between said stem and said air line to normally discharge air from said tire to the air line, a lock securing the auxiliary wheel to the landing gear wheel and in opposition to the pressure of the air in the cylinder on said piston, and a control to release said lock and permit the piston to move outwardly of the cylinder to separate the auxiliary wheel from the landing gear-wheel.

10. A dual wheel landing gear assembly comprising a main wheel, an auxiliary wheel, each of said wheels having an axle about which it independently rotates, said axles being disposed in axial alignment with said wheels resting side by side, a ball lock fixedly connecting the axles one to the other, a spring-loaded plunger carried by the axle of the main wheel and normally disposed in position on and against the balls of said lock to project them into positive locking connection of the axles, means carried by and operative on the plunger for movement thereof out of its normal position aforesaid for release of the balls and disconnection of the axles, inflated tires on said wheels, and a power cylinder and piston normally suppressed by said lock and charged with fluid under pressure from the tire of the auxiliary wheel, said cylinder and piston being carried by the auxiliary wheel with the piston in abutment with the main wheel whereby said wheels are separated upon the movement of the plunger to release said lock.

11. In an airplane a dual wheel landing gear assembly comprising a pair of axles partially telescoped one within the other, a lock to secure said telescoped axles against separation, a main wheel mounted on one axle, an auxiliary wheel mounted on the other axle, each of said wheels including an inflated tire, pneumatic power means carried by the auxiliary wheel and disposed adjacent the main wheel, a stem projecting from the tire of the auxiliary wheel for the inflation thereof with air under pressure, a conduit connecting said power means with the tire of the auxiliary wheel, a valve interposed between said stem and said conduit and adjustable to a position closing said conduit and concurrently opening said stem and to a position opening said conduit and concurrently closing the stem whereby to constantly charge the power means with air under pressure from said tire to thereby act against the main wheel and said lock for the separation and removal of the auxiliary wheel from the assembly, and a release for said lock to disengage said axles and permit the pneumatic power means to function.

12. In an airplane a dual wheel landing gear assembly comprising a pair of wheels, a releasable lock interposed and operative between said wheels to connect them one to the other against relative displacement, a cylinder carried by one of said wheels, a piston mounted in said cylinder and projecting therefrom to abut the other wheel, a source of fluid under pressure, means connecting said source to one end of the cylinder whereby fluid from the source constantly acts on and against said piston to tend to move it outwardly of said cylinder for the separation of the wheels, such action being restrained by said lock, and a release for said lock for spontaneous movement of the piston as aforesaid.

13. A dual wheel landing gear assembly for an airplane comprising a pair of wheels each having a hollow axle one partially telescoped within the other, a lock connecting the telescoped portions of said axles against relative longitudinal movement, a piston mounted within one of said wheels and projecting therefrom to abut the other of said wheels, a source of fluid under pressure operatively connected at all times to a face of said piston in opposition to said lock, and means to release said lock for the free operation of the piston whereby said axles are separated and one of said wheels is removed from the assembly.

14. A dual wheel landing gear assembly for an airplane comprising a pair of wheels of equal diameter, each of said wheels having a hollow axle about which it rotates, an extension of the axle of one wheel telescopically received in the axle of the other wheel whereby said axles combine in supporting the load of the airplane, power means carried by one of the wheels and disposed between adjacent sides of said wheels always tending to separate the axles thereof, a releasable lock connecting said axles one to the other against relative movement and against the operation of said power means, and a control to release said lock whereby said power means becomes effective to separate said axles.

15. A dual wheel landing gear assembly for an airplane comprising a main wheel and an auxiliary wheel, each wheel having a hollow axle about which it independently rotates, an extension on the axle of the auxiliary wheel telescoped with the axle of the main wheel, a releasable lock connecting said extension to the axle of the main wheel to prevent the separation thereof, ejecting means carried by one of said wheels and always tending to move the auxiliary wheel away from the main wheel in opposition to said lock, and means for releasing said lock and thereby permitting said ejecting means to function.

16. The combination with a dual wheel landing gear assembly comprising a main wheel and an auxiliary wheel each mounted on individual axles, of a releasable lock connecting said axles one to the other in end-to-end abutment whereby said wheels are disposed in parallel adjoining positions for operation in unison, means interposed between said wheels concentrically and outwardly of said axles, said means always tending to separate said wheels by moving the auxiliary wheel in a direction away from the main wheel, and independent means normally engaging said lock and movable out of such engagement to thereby release said lock and permit the separation of said wheels.

References Cited in the file of this patent

UNITED STATES PATENTS 2,637,512  Albright _____ May 5, 1953

FOREIGN PATENTS 695,892  Great Britain _____ Aug. 19, 1953